United States Patent [19]

Burks, Jr. et al.

[11] Patent Number: 5,622,775
[45] Date of Patent: Apr. 22, 1997

[54] LAYERED SMOOTH SURFACE ARAMID PAPERS OF HIGH STRENGTH AND PRINTABILITY

[75] Inventors: Philip P. Burks, Jr., Chesterfield; Lee J. Hesler, Richmond, both of Va.

[73] Assignee: E. I. Du Pont de Nemours and Company, Wilmington, Del.

[21] Appl. No.: 496,705

[22] Filed: Jun. 29, 1995

Related U.S. Application Data

[63] Continuation-in-part of Ser. No. 107,841, Aug. 24, 1993, abandoned.

[51] Int. Cl.⁶ ................. B32B 33/00; D21H 13/26; D21H 27/38
[52] U.S. Cl. ................. 442/392; 162/129; 162/146; 162/206; 428/303; 428/337
[58] Field of Search .................... 162/129, 146, 162/206; 428/287, 297, 298, 303, 337

[56] References Cited

U.S. PATENT DOCUMENTS

| | | | |
|---|---|---|---|
| 2,999,788 | 9/1961 | Morgan | 162/146 |
| 3,756,908 | 9/1973 | Gross | 162/146 |
| 4,940,512 | 7/1990 | Hendren et al. | 162/146 |
| 4,992,141 | 2/1991 | Sullivan | 162/146 |
| 5,021,123 | 6/1991 | Sweeny | 162/146 |
| 5,026,456 | 6/1991 | Hesler et al. | 162/146 |
| 5,028,300 | 7/1991 | Hollberg et al. | 162/146 |
| 5,076,887 | 12/1991 | Hendren | 162/146 |
| 5,089,088 | 2/1992 | Hendren et al. | 162/123 |
| 5,126,012 | 6/1992 | Hendren et al. | 162/146 |
| 5,223,094 | 6/1993 | Kirayoglu et al. | 162/146 |
| 5,296,286 | 3/1994 | Allen et al. | 162/146 |
| 5,316,839 | 5/1994 | Kato et al. | 162/129 |

FOREIGN PATENT DOCUMENTS

| | | | |
|---|---|---|---|
| 61-174497 | 8/1986 | Japan | D21H 1/02 |
| 2-236907 | 9/1990 | Japan | H01B 3/52 |
| 3-216912 | 9/1991 | Japan | H01B 3/52 |
| 4-6708 | 1/1992 | Japan | H01B 3/52 |

OTHER PUBLICATIONS

WO9416142–A1, Abstract.; L.J. Hesler, et al., Derwent Bulletin No. 9430, Aramid Paper having Excellent Heat–resistance, Surface Smoothness and High Processability–comprises base, intermediate and surface layer; Jul. 21, 1994.

*Primary Examiner*—James C. Cannon

[57] ABSTRACT

A multi-layered smooth-calendered surface aramid paper with high break strength and tear resistance comprises a substrate layer and at least one surface layer intimately bonded to the substrate layer, wherein the surface layer(s) consists essentially of 65 to 90% by weight aramid fibrids and 10 to 35% by weight aramid floc and comprises 10 to 67% of the total basis weight of the paper.

4 Claims, No Drawings

LAYERED SMOOTH SURFACE ARAMID PAPERS OF HIGH STRENGTH AND PRINTABILITY

This is a continuation-in-part of a application Ser. No. 08/170,841 filed Dec. 21, 1993, now abandoned.

BACKGROUND OF THE INVENTION

This invention relates to an improved layered aramid paper having a smooth-calendered surface and good tensile and tear strengths and low ink absorption so that the paper is suitable for printing over its entire surface. The smooth-calendered surface and low ink absorptivity provides better print clarity and makes such papers particularly useful for high temperature label applications even including those label printing applications that require high clarity and definition such as, for example bar coding. It is known in the art that aramid papers having 40–55% fibrids perform well in many uses. Prior art techniques that improve on surface smoothness often lead to a reduced level of mechanical strength and/or thermal stability: For example, surface smoothness can be improved by the increased concentration of fibrids in the paper, but while increasing the concentration of fibrids in the paper improves smoothness, the fibrids do not provide mechanical strength. When the fibrid content of the paper is high enough to provide a calendered surface suitable for high quality printing, the mechanical strength of the paper is diminished to such an extent the sheet is not usable in practice. Aramid papers, which do not have high fibrid content and mechanical strength and which have been pressed or calendered at high temperature and pressure will generally have fibers on the surface which cause roughness or snagging when the surface of the paper is worked during end use processing. This roughness can be measured as a surface abraded fiber count. Too great a surface roughness renders the surface of the paper unsuitable for high definition, high clarity printing.

In U.S. Pat. No. 4,888,091 to Nollen et al. an uncalendered sheet structure is disclosed that is useful for use in thermal and acoustical insulation. The sheet according to Nollen et al. is a commingled mixture of floc (short fibers) and fibrids. The sheet can be expanded to form air pockets after it is dried, but the sheet itself or some layered structure of these sheets is subject to the limitation on surface smoothness and mechanical strength as described above. That is as more fibrids are used to increase surface smoothness, mechanical properties of the paper decline rapidly to a point of practical limitation. Attempts to improve mechanical properties by expanding the wetted sheet structure render the surface unsuitable for printing by creating expanded portions which can be easily flexed.

The present invention is a single, consolidated paper formed of multiple layers each having a different compositions as to the weight percentage of fibrids and short fibers. The surface layer is constituted to provide a smooth-calendered nonpatterned surface having low ink absorption and being suitable for printing. The substrate layer, the layer supporting the surface layer or layers, is constituted to provide for mechanical properties. The surface and substrate layers are wet laid in such a way that they bonded at the interface of the layers such that the paper is a single, consolidated structure that can not be easily separated into the multiple layers from which it is formed. A sheet of paper according to the present invention can be pictured in its most simple form as having two layers which constitute a single sheet although in practice it is more common for a sheet according to present invention to have two surface layers and a substrate or even to be constituted of more than three layers. Considering then the most simple form of the invention having a surface and a substrate, the surface layer covering the substrate is fibrid rich when compared to the composition of the substrate layer. The substrate layer provides a fiber rich layer imparting mechanical strength. The process of wet laying one layer on the other forms the consolidated, unified structure. The surface layer composition is such that the paper can be calendered resulting in a paper surface which is not rough. The smooth-calendered surface of the paper according to the present invention provides a surface suitable for high quality printing. The thickness of each layer can be varied to produce a combination of surface smoothness and mechanical properties required for a particular printing purpose.

SUMMARY OF THE INVENTION

This invention provides a multi-layered, smooth-calendered aramid paper containing from 40 to 55% by weight of fibrids and comprising a substrate layer which consists essentially of aramid fibrids and floc and one or two surface layers each intimately bonded to the substrate layer, said surface layer(s) consisting essentially of from 65 to 90% by weight aramid fibrids and from 10 to 35% by weight aramid floc and comprising from 10 to 67% of the weight of the paper. The entire surface of the paper is smooth-calendered and suitable for high quality printing. Preferably, the paper has a density of 0.8 to 1.0 g/cc with thickness of 1 to 30 mils (0.025 to 0.762 mm).

DETAILED DESCRIPTION OF THE INVENTION

The multi-layered aramid papers of the invention are comprised of layers of different compositions to provide desired properties. The surface layer(s) provide a smooth surface and contain from 65 to 90% aramid fibrid and from 10% to 35% of aramid floc. The surface layer(s) constitutes from 10 to 67% of the weight of the paper. The substrate layer provides high tear strength and contains, for example from 10 to 35% by weight fibrids and from 65 to 90% by weight floc. In order for the multi-layered paper to behave as a unitary structure, it is preferred that the fibrous materials at the interface between layers be intermingled. This is achieved by depositing a layer of furnish, i.e., a paper-making aqueous dispersion of floc and fibrid on an undried, previously formed layer of furnish in a paper making machine or by simultaneously depositing the layers of different composition on the screen of the paper making machine using a 2 or 3 layer hydraulic type headbox. The paper coming off the machine is dried and calendered, preferably to a thickness of from 1 to 30 mils using a smooth surface, nonpatterned calender roll. The smooth calender roll consolidates the paper over its entire area creating a paper having a uniformly smooth surface of low ink absorption. The density of the layered paper is preferably from 0.8 to 1.0 g/cc for use as labels.

It has been found that the multi-layered papers of this invention have excellent mechanical properties because the overall amount of fibrids in the sheet is maintained at 40 to 55%. The smooth surface retains a high degree of smoothness even after the necessary working to prepare it for end use applications. A smooth-calendered surface suitable for high quality printing can be achieved in the present invention since the mechanical properties are provided in a fiber rich substrate layer leaving the surface layer that can be made as rich in fibrids as required to provide a surface that can be smooth-calendered to meet the demands of clarity and definition of the printing process. This quality of print smoothness is important if print clarity and color density is to be achieved. The term smooth-calendered is used to mean that the surface of the paper has been calendered with a smooth nonpatterned calendar roll. The use of a calendered roll having a surface other than one which is smooth and polished would produce a paper having unacceptable print clarity.

Aramid floc is high temperature resistant floc or short fiber cut from longer aramid fiber, such as those prepared by processes described in U.S. Pat. Nos. 3,063,966; 3,133,138; 3,767,756 and 3,869,430. It refers to short fibers typically having a length of 2 to 12 mm and a linear density of 1–10 decitex, made of aromatic polyamide which is non-fusible.

The aramid fibrids can be prepared using a fibridating apparatus where a polymer solution is precipitated and sheared in a single step as described in U.S. Pat. No. 3,756,908.

Tests and Measurements

Total Break Strength. The tensile break strength of paper is determined based on ASTM method D 828-87 for "Standard Test Method for Tensile Breaking Strength of Paper and Paperboard". Specimens are 2.54 cm wide and 20.3 cm long and the jaws of the tensile testing machine are initially separated by 12.7 cm. Ten paper samples are tested in the machine direction (MD) and ten are tested in the cross direction (CD) and the values for each direction are averaged. The total of the MD and CD strengths is divided by paper density and paper basis weight to obtain the Total Break Strength.

Thickness. Thickness of papers is determined using calipers in accordance with ASTM D 374-79 (1986).

Density. Density of papers is determined by determining the weight per unit area of the paper (Basis Weight) in accordance with ASTM D 646-86 and dividing by the thickness.

Abraded Fiber Count

In order to further investigate the abrasion qualities of these papers, the papers were folded and the edge of the fold was viewed against a dark background. The number of fibers extending greater than about 0.5 mm above the solid paper surface was taken as the Abraded Fiber Count (per centimeter) and indicates the degree of roughness of the sample.

The following examples are illustrative of the invention and are not to be construed as limiting.

EXAMPLES

EXAMPLE 1

A two layered structure was made by combining fibrids of poly(m-phenylene isophthalamide) prepared as described in Example 1 of U.S. Pat. No. 3,756,908 and floc prepared by dry spinning poly(m-phenylene isophthalamide) from a solution containing 67% dimethyl acetamide (DMAc), 9% calcium chloride and 4% water. The spun filaments were flooded with an aqueous liquid and contained about 100% DMAc, 45% calcium chloride and 30–100% water based on dry polymer. The filaments were washed and drawn 4X in an extraction-draw process in which the chloride and DMAc contents were reduced to about 0.10% and 0.5%, respectively. The filaments had a denier of 2 (2.2 dtex) and typical properties were: elongation to break, 34%, and tenacity, 4.3 grams/denier (3.8 dN/tex). The filaments were then cut to floc length of 0.27 inch (0.68 cm) and slurried in water to a concentration of about 0.35%.

Blends of fibrids and floc were separately fed to a 2-layer hydraulic type headbox which maintains each blend as a distinct layer until the slice exit where limited mixing of the layers occurs. This allows good bonding between the layers while still maintaining the individual nature of each layer. The formed paper is then processed as is normally done on a fourdrinier paper machine by pressing and drying.

The papers are dried completely using infrared heaters before being calendered at 320° C. at a line speed of 30 feet per minute (9 meters per minute) using a pressure of 725 pounds per linear inch (130 kg/cm).

The composition of the layers varied from 35 to 65% fibrid, the remainder being floc. The basis weight of each layer was adjusted so that the high fibrid layer (65% fibrid) ranged from 33 to 67% of the total basis weight of the final sheet. The total fibrid content of the test papers ranged from 45 to 55% of the sheet versus 53% for the single layer control papers (C1-1). Table 1 gives the basis weight of each layer and its composition.

TABLE 1

| Run Number | Total Sheet | | | Substrate Layer | | | Surface Layer | | |
|---|---|---|---|---|---|---|---|---|---|
| | BW aim g/m² | % Fibrid | % Floc | BW aim g/m² | % Fibrid | % Floc | BW aim g/m² | % Fibrid | % Floc |
| 1-1 | 42 | 45 | 55 | 28 | 35 | 65 | 14 | 65 | 35 |
| 1-2 | 42 | 50 | 50 | 21 | 35 | 65 | 21 | 65 | 35 |
| 1-3 | 42 | 55 | 45 | 14 | 35 | 65 | 28 | 65 | 35 |
| C1-1 | 42 | 53 | 47 | 42 | 53 | 47 | — | — | — |

The amount of loose fibers on the surfaces of the sheet as a result of mechanical working of the calendered paper was measured (Table 2). Side 1 is the substrate layer (low fibrid content layer) and Side 2 the surface (high fibrid content) layer.

TABLE 2

| | Abraded Fiber Count | |
|---|---|---|
| Sample | Fiber Count (per 5 cm) | |
| Number | Side 1 | Side 2 |
| 1-1 | 20 | 0 |
| 1-2 | 12 | 2 |

TABLE 2-continued

Abraded Fiber Count

| Sample Number | Fiber Count (per 5 cm) | |
|---|---|---|
| | Side 1 | Side 2 |
| 1-3 | 14 | 0 |
| C1-1 | 14 | — |

Even with the significant reduction in the number of loose fibers on the surface of the high fibrid content papers, superior mechanical properties are maintained versus a control paper of similar average composition but with no layering (Table 3).

TABLE 3

| | Calendered Paper Properties | | | |
|---|---|---|---|---|
| Sample Number | 1-1 | 1-2 | 1-3 | C1-1 |
| B. W.*, oz/yd$^2$ (g/m$^2$) | 1.3 (44.1) | 1.5 (50.9) | 1.4 (47.5) | 1.3 (44.1) |
| Thickness, mils (mm) | 2.0 (0.051) | 2.5 (0.064) | 2.2 (0.056) | 2.4 (0.061) |
| Density, g/cc | 0.82 | 0.89 | 0.86 | 0.72 |
| B.S.**, lb/in MD/CD (N/cm) | 15/7 (26/12) | 21/1018/7 (37/18) | (32/12) | 20/8 (35/14) |
| Eb***, MD/CD | 4/3 | 6/3 | 5/2 | 6/3 |
| Elmendorf Tear, g MD/CD (N) | 108/ 191 (1.06/ 1.87) | 120/ 193 (1.18/ 1.89) | 87/ 166 (0.85/ 1.63) | 127/ 215 (1.25/ 2.11) |
| Shrinkage @ 300° C., % MD/CD | 2/0 | 2/0 | 2/0 | 2/0 |

*Basis Weight
**Break Strength
***Break Elongation

EXAMPLE 2

Layered structures, 4.0–4.5 oz/yd$^2$ (135.6–152.6 g/m$^2$) were produced with high fibrid layers on both top and bottom of the structure. The top and bottom plies (outer layers) had equal basis weight. The top and bottom layers contain 65% fibrid and 35% floc. The top layer was applied using a secondary headbox jetting the furnish onto an already formed sheet which was prepared using the headbox of Example 1. The control (C2-1) was a single layer paper.

TABLE 4

| | Total Sheet | | | Each Outer Layer | | | Inner (Substrate) Layer | | |
|---|---|---|---|---|---|---|---|---|---|
| Run Number | BW aim g/m$^2$ | % Fibrid | % Floc | BW aim g/m$^2$ | % Fibrid | % Floc | BW aim g/m$^2$ | % Fibrid | % Floc |
| 2-1 | 132 | 46 | 54 | 24 | 65 | 35 | 84 | 35 | 65 |
| 2-2 | 132 | 55 | 45 | 44 | 65 | 35 | 44 | 35 | 65 |
| C2-1 | 137 | 47 | 137 | 53 | 47 | — | — | — | — |

Improvement in the amount of loose fibers on the surface as a result of mechanical working of the paper is obvious from Table 5.

TABLE 5

Abraded Fiber Count

| Sample Number | Fiber Count (per 5 cm) |
|---|---|
| 2-1 | 5 |
| 2-2 | 7 |
| C2-1 | 12 |

Even with the major reduction in the number of loose fibers on the surface of the papers superior mechanical properties are maintained versus a control paper of similar average composition but with no layering (Table 6). The low shrinkage at 300° C. along with the high tear and tensile properties as compared with the control is especially noteworthy.

TABLE 6

| | Calendered Paper Properties | | |
|---|---|---|---|
| Sample Number | 2-1 | 2-2 | C2-1 |
| Basis Weight, oz/yd$^2$ (g/m$^2$) | 4.3 (145.7) | 4.3 (145.8) | 4.1 (139.0) |
| Thickness, mils (mm) | 7.5 (0.191) | 6.7 (0.170) | 6.8 (0.173) |
| Density, g/cc | 0.77 | 0.87 | 0.80 |
| B.S., lb/in MD/CD (N/cm) | 55/30 (96/53) | 61/39 (107/68) | 54/33 (95/58) |
| Eb, % MD/CD | 6/4 | 9/6 | 7/5 |
| Elmendorf Tear, g MD/CD (N) | 695/762 (6.82/7.48) | 421/598 (4.13/5.87) | 504/662 (4.94/6.49) |
| Shrinkage @ 300° C., % MD/CD | 1/1 | 1/1 | 1/1 |

We claim:

1. A multi-layered smooth-calendered aramid paper having a surface suitable for high quality printing wherein the paper contains from 40 to 55% by weight of fibrids and comprises a substrate layer which consists essentially of aramid fibrids and floc and one or two surface layers, each bonded to the substrate layer to from a single consolidated sheet, said surface layer(s) comprising from 10 to 67% of the weight of the paper and consisting essentially of from 65 to 90% by weight aramid fibrids and from 10 to 35% by weight aramid floc and wherein the entire surface of the paper is smooth-calendered.

2. The paper of claim 1 having a density of 0.8 to 1.0 g/cc and a thickness of 1 to 30 mils (0.0254 to 0.762 mm).

3. The paper of claim 1, wherein said paper comprises two surface layers intimately bonded to opposite sides of said substrate layer.

4. An improved aramid paper consisting of aramid fibrids and floc said improvement having been provided by forming the paper as a multi-layered consolidated structure containing from 40 to 55% by weight of fibrids comprising a substrate layer which consists essentially of aramid fibrids and floc and one or two surface layers, each bonded to the substrate layer to form a single consolidated sheet, said surface layer(s) comprising from 10 to 67% of the weight of the paper and consisting essentially of from 65 to 90% by weight aramid fibrids and from 10 to 35% by weight aramid floc and calendering the entire surface of the paper using a smooth surface calender roll.

* * * * *